United States Patent [19]

Hurtig et al.

[11] 4,205,808
[45] Jun. 3, 1980

[54] TAPE CARTRIDGE

[75] Inventors: Roy E. Hurtig, Saratoga; Stanley I. Rojo, San Jose, both of Calif.

[73] Assignee: Verbatim Corporation, Sunnyvale, Calif.

[21] Appl. No.: 5,325

[22] Filed: Jan. 22, 1979

[51] Int. Cl.² .................... G11B 15/32; G11B 23/08
[52] U.S. Cl. .................................................. 242/192
[58] Field of Search ............... 242/192, 210, 76, 75.1; 360/93, 96

[56] References Cited

U.S. PATENT DOCUMENTS

| | | | |
|---|---|---|---|
| 3,907,230 | 9/1975 | Merle et al. | 242/67.5 |
| 4,146,194 | 3/1979 | Majicek | 242/75.1 X |

Primary Examiner—George F. Mautz
Attorney, Agent, or Firm—Thomas E. Schatzel

[57] ABSTRACT

An improved tape cartridge having two tape packs mounted for rotation in a housing; an endless elastic belt mounted about a first and second roller to engage the tape packs on their periphery; said first roller rotatable about a stationary axis; said second roller being a floating belt-guide roller urged by the tension of the belt against the two tape packs with the belt squeezed between each pack and said first roller, said floating belt-guide roller having a draft on the outer surface to form a frusto-conical shape; means for driving said belt whereby as said belt is driven the belt tends to climb to the high side of the floating roller urging the central hub of the floating belt-guide roller to point contact with the base plate of the housing.

9 Claims, 4 Drawing Figures

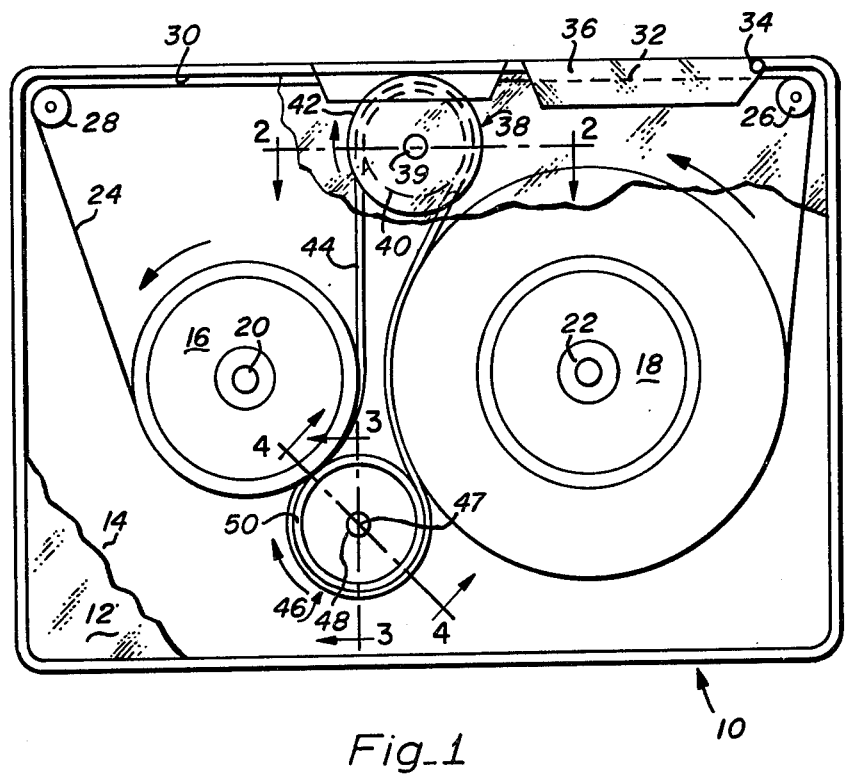
Fig_1
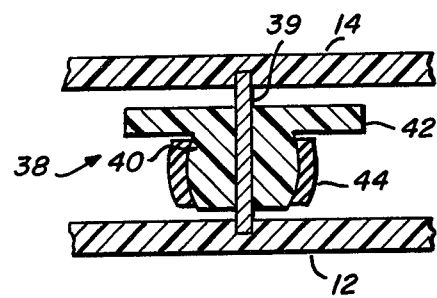
Fig_2

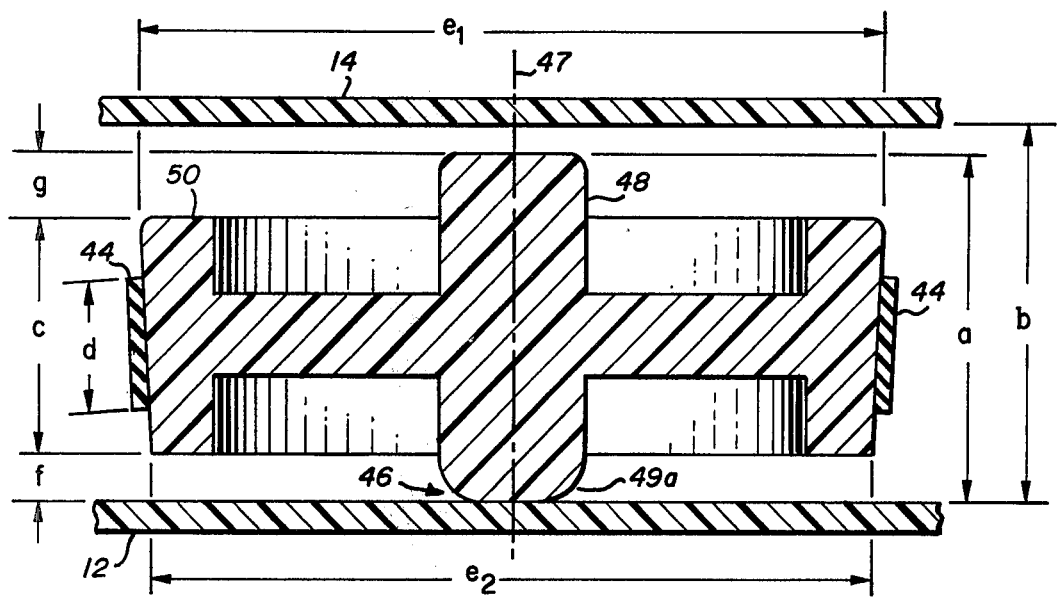
Fig_3
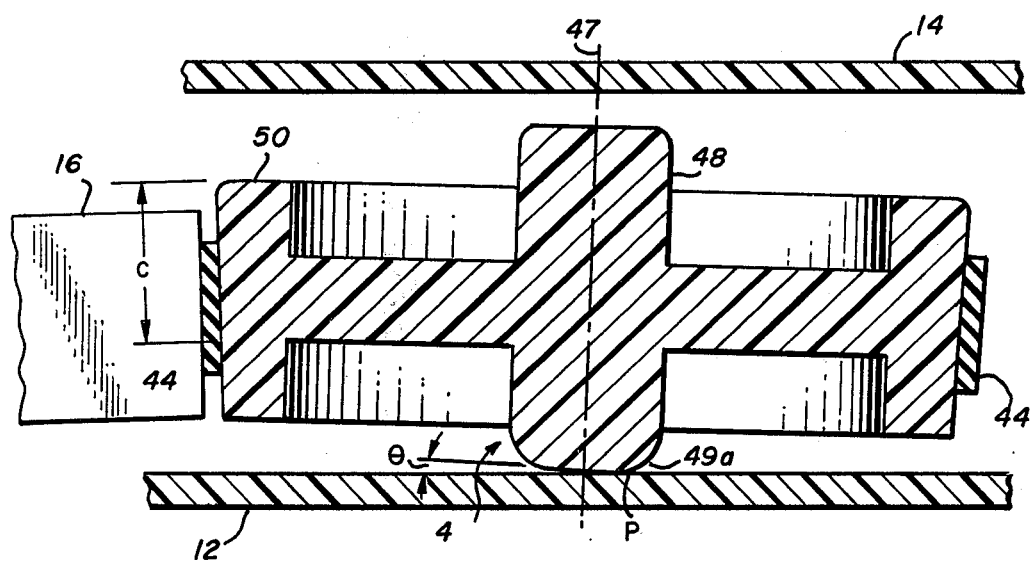
Fig_4

TAPE CARTRIDGE

BACKGROUND OF THE INVENTION

1. Field of the Invention

The present invention relates to tape cartidges for magnetic tape drive systems having a belt drive which contacts the tape and more particularly to such a tape cartridge with an improved floating roller belt drive mechanism.

2. Description of the Prior Art

Magnetic tape transports having belt drive systems is known in the prior art. Such a system is described in U.S. Pat. No. 3,907,230 which comprises a tape cartridge with a belt drive means with a belt engaging a freely rotatable roller means for squeezing a zone of said belt against the peripheral surface of the tape about the supply and take-up packs.

Belt drive systems have advantages over the more conventional drive engaging the shafts of the reel packs. In such more conventional systems, difficulty is encountered from the changes in diameter and in angular speed of the reel packs when one reel is paid out and the other taken up. This problem has been partially solved by systems wherein the reels are driven tangentially by the belt.

In using a belt, it is necessary that the position of the belt float due to the constantly changing diameter of the tape on both the supply and take-up reel packs. In using a floating roller engaged to the belt, the roller tends to be unstable. The roller instabilities in turn inflict instabilities in the belt which in turn inflicts instabilities in the tape as it is transported. The instabilities in the tape result in flutter which in turn limits the recording and playback efficiencies in the tape transport system. The instabilities further tend to cause audible noise in the tape drive system which decreases the desireability of such systems by consumers.

SUMMARY OF THE PRESENT INVENTION

It is therefore an object of the present invention to provide an improved tape cartridge which utilizes a belt drive.

It is another object of the present invention to provide an improved tape cartridge which utilizes a belt drive with a floating roller.

It is another object of the present invention to provide an improved tape cartridge which utilizes a belt drive with an improved floating roller.

Briefly, a preferred embodiment includes a magnetic tape cartridge having a frame with a supply reel and take-up reel mounted on said frame. Guide means are provided for guiding a tape web along a defined path intermediate the supply and take-up reels. An endless elastic belt engages an arcuate portion of tape on the supply reel and an arcuate portion of tape on the take-up reel. The belt further engages a crowned first roller and a second roller with the first roller mounted for rotation on said frame to guide the belt intermediate the supply reel and the take-up reel. The second roller is mounted for guiding the belt intermediate the take-up reel and the supply reel said second roller being floatable intermediate the periphery of the supply and take-up packs as the diameter of said packs varies. The belt constantly urges the floating roller toward said reels. The surface of the idler roller is tapered to form a frusto-conical shape with the diameter about the upper lip greater than the diameter about the lower lip and the first roller is crowned.

An advantage of the present invention is that the belt tends to climb to the upper lip of the floating roller thereby stabilizing the roller.

Another advantage of the present invention is that operation noise is significantly reduced and nearly not audibly existent under normal environments.

Another advantage of the present invention is that it reduces belt run-off.

These and other objects and advantages of the present invention will no doubt become apparent to those skilled in the art after having read the following detailed description of the preferred embodiment which is illustrated in the various figures of the drawing.

IN THE DRAWING

FIG. 1 illustrates a tape cartridge according to the present invention;

FIG. 2 is an enlarged cross-sectional view of the capstan taken along the line 2—2 of the cartridge of FIG. 1;

FIG. 3 is a cross-sectional view of the floating belt-guide roller of the cartridge of FIG. 1 taken along line 3—3;

FIG. 4 is an enlarged cross-sectional view of the floating belt-guide roller taken along the line 4—4 of FIG. 1 when rotating.

DETAILED DESCRIPTION OF THE PREFERRED EMBODIMENT

Referring now to FIG. 1, there is shown a digital data cartridge 10 for a magnetic tape recorder. The cartridge 10 has a base plate 12 and a top plate 14. Two rotatable reels 16 and 18 are mounted on two spindles 20 and 22, respectively, anchored to the base plate 12 such that the axes of the reel drums 16 and 18 are parallel to one another. The reels 16 and 18 carry a magnetic tape web 24 and the spindles 20 and 22 are placed at a distance chosen in accordance to the length and thickness of the tape web used so that there is a space between the periphery of the two reels 16 and 18 when each of the reels contain the same amount of tape 24.

The tape web 24, wound on the supply reel 18, runs through guide means and winds on the take-up reel 16. The guide means includes two fixed guides 26 and 28 mounted on axes parallel to the spindles 20 and 22. The guides 26 and 28 are arranged along an edge 30 of the cartridge for defining a tape path having a straight portion adjacent the edge 30. Along the straight portion of the path of the tape web 24, is a lid 32 which can swivel on a hinge 34 to clear a spot 36 for the magnetic read or write head.

On the base plate 12 and at an equal distance from the spindles 20 and 22, is rotatingly mounted a crowned capstan 38 mounted rotatingly on a spindle 39. The axis of spindle 39 is parallel to the axes of the spindles 20 and 22 and is anchored laterally in place to the plates 12 and 14. The capstan 38 has a first crowned hub 40 and a second hub 42 which is of larger diameter than the maximum diameter of the hub 40. The hub 42 is adapted to be driven by a drive which is a part of the tape transport in which the cartridge is inserted. An endless drive belt 44 comprised of rubber or other elastic material, is positioned around the crowned hub 40 of the capstan 38. The belt 44 bears against the peripheral surfaces of the tape 24 wrapped about the reels 16 and 18 and around a floating belt-guide roller 46 which rotates about an axis 47. The floating belt-guide roller 46 constantly pinches the belt 44 on the outer surface of the tape on the reels 16 and 18 due to the elastic tension imposed by the belt 44.

As illustrated in FIGS. 3 and 4 the floating belt-guide roller 46 has a central hub 48 of an axial length "a". The length "a" is less than the internal depth of the cartridge 10, i.e. the spacing "b" between the internal surfaces of the base plate 12 and top plate 14. The roller 46 is comprised of a bearing material (i.e. low coefficient of friction material) such that the roller 46 may slide laterally and smoothly over the internal surfaces of the base plate 12 as the diameter of the packs formed on the reels 16 and 18 vary. Thus, the idler floating roller 46 can rotate about its axis 47 and move laterally along the plane of the base plate 12. The corner of the hub 49 is "rounded" at its peripheral edge 49a.

The floating roller 46 has an outer rim 50 shaped in the form of a frusto-conical member with a width "c" which is less than the length "a" of the hub 48, and greater than the width "d" of the drive belt 44. The diameter "$e_1$" of the rim 50 about its upper lip is greater than the diameter "$e_2$" about the lower lip, as illustrated. The hub 48 projects beyond the lower lip of the rim 50 by a distance "f", and beyond the upper lip of rim 50 by a distance "g". Thus, in operation, as the belt 44 is driven, it tends to climb toward the upper rim of diameter "$e_1$". However, since the hub 40 of the capstan roller 38 is crowned, the maximum height of the belt 44 in operation is controlled so that it does not go over the edge of the rim 50. Preferably the crown is at a point coinciding with the center of the tape 24. This facilitates having the belt 44 contact the tape 24 of the take-up reel 20 about the center of the tape 24. The climbing and tendency to try to continuously climb causes the floating roller 46 to tip slightly about its axis thus pulling the idler forward as diagrammatically illustrated in FIG. 4. Thus, the floating roller 46 makes point contact with the base plate 12 at a point "P" lateral to the axis 47 as the roller rotates. The point "P" moves as the volume of tape on the reels 16 and 18 vary and the roller "floats". The degree of tip "$\theta$", corresponds to a degree necessary to cause the tapered surface of the rim 50 to be parallel with the outer peripheral surface of the tape on the take-up reel 16. The roller 46, being of bearing material, e.g. a low-coefficient-of-friction composition including Delrin with or without Teflon, floats across the surface of the base plate 12 under the lateral forces imposed by the belt 44 as the radius of the tape packs formed on the reels 16 and 18 vary. In operation, the contact at point "P" between the hub 48 and wall 12 is a "feather" touch without any significant force.

The degree of taper of the outer rim 50 may be on the order of a few degrees. For example, in an embodiment of the cartridge structure of FIGS. 1–4 using a tape of 0.150 inch width, the floating roller has a dimension "a" of 0.285 inches, "c" of 0.185 inches, "$e_1$" of 0.502, "$e_2$" of 0.500, "f" of 0.035 inches and "g" of 0.65 inches. Thus, the amount of taper, that is the amount of taper of hub 50 is approximately 1%.

With the cartridge embodiments of FIGS. 1–4, flutter and audible operational noise is substantially reduced relative to that of prior art cartridges operating at the same speeds. The advantages become more significant when recording and/or playing back data at high frequencies. The stabilized floating idler reduces instantaneous speed variations which inturn reduce flutter. It further provides stabilizing effect to track the belt thereby reducing belt runoffs.

It has further been found that if the floating roller is reversed such that the smaller diameter "$e_2$" is adjacent the top plate 14, the hub 48 contacts the top plate 14 and slides along its surface.

While, for the sake of clearness and in order to disclose the invention so that the same can be readily understood, a specific embodiment has been described and illustrated, it is to be understood that the present invention is not limited to the specific means disclosed. It may be embodied in other ways that will suggest themselves to persons skilled in the art. It is believed that this invention is new and that all such changes that come within the scope of the following claims are to be considered as part of this invention.

What is claimed is:

1. A tape cartridge comprising:
   a housing;
   a pair of tape packs rotatably mounted about spaced parallel axes in a plane in said housing with a tape web connecting said packs;
   tape guide means for defining a tape path for said tape web;
   a pretensioned endless belt having two arcuate portions passing between and engaging said tape packs; and
   roller means disposed in said plane for rotation relative to said housing for guiding said belt along first and second belt paths between said belt arcuate portions, said roller means including a first roller member rotatably mounted about a stationary axis and engaged by said belt along a portion of said first belt path, a floating roller with a central hub and a frusto-conical shaped outer rim with only one terminal end of the central hub being in contact with said housing, said outer rim being engaged by said belt along said second belt path to be urged by the tension of said belt into tangential relationship with said packs for simultaneously squeezing said belt at the ends of said second belt path against said tape packs respectively and said floating roller being axially tilted about the terminal end of the hub in contact with the housing.

2. The tape cartridge of claim 1 wherein
   the housing includes a base plate and a top plate parallel with the base plate, the first roller being mounted with its stationary axis normal to the plane of the base plate and stationary relative to said base plate and the central hub of the floating roller being of an axial length less the internal vertical spacing between said base and top plates, said hub being in continuous contact with one of said plates about one terminal end of said hub.

3. The tape cartridge of claim 2 wherein
   said first roller has a crowned outer surface for retaining the lateral position of the belt on the roller stationary during operation.

4. The tape cartridge 3 wherein
   the diameter of the edge of the outer rim of the floating roller adjacent to the plate in contact with said central hub is less than the diameter of the opposite edge of the rim.

5. The tape cartridge of claim 4 wherein
   the terminal end of the hub in contact with one of said plates is rounded.

6. The tape cartridge of claim 5 wherein the degree of taper of said outer rim is approximately 1%.

7. The tape cartridge of claim 6 wherein the floating belt-guide roller is comprised of a bearing material having a low-coefficient-of-friction whereby the floating roller floats across the surface of the plate under the lateral forces imposed by the belt and provides a relatively slippery surface to the belt.

8. The tape cartridge of claim 7 wherein said first roller is a capstan.

9. The tape cartridge of claim 8 wherein the crown of the capstan is at a position coinciding with the center line of the tape web.

* * * * *